United States Patent [19]

Oberjatzas et al.

[11] Patent Number: 4,969,055
[45] Date of Patent: Nov. 6, 1990

[54] METHOD FOR RECORDING AND/OR REPRODUCING DIGITALLY CODED SIGNALS WITH INTERFRAME AND INTERFRAME CODING

[76] Inventors: Günter Oberjatzas, Langen Kampstrasse 42, D-3013 Barsinghausen, Fed. Rep. of Germany; Werner Keesen, Adlerstrasse 25, D-4130 Moers 1, Fed. Rep. of Germany; Jean-Yves Catros, 20 rue Papu, F-35000 Rennes, France; Christian J. Richard, 12 rue des Prés Hauts, F-35530 Brece, France

[21] Appl. No.: 237,637

[22] Filed: Aug. 25, 1988

Related U.S. Application Data

[63] Continuation of Ser. No. 901,535, filed as PCT EP85/00505 on Oct. 1, 1985, published as W086/02516 on Apr. 24, 1986 abandoned.

[30] Foreign Application Priority Data

Oct. 10, 1984 [DE] Fed. Rep. of Germany ....... 3437182

[51] Int. Cl.$^5$ ................................................. G11B 5/09
[52] U.S. Cl. ........................................................ 360/32
[58] Field of Search .............................. 360/32, 39, 40; 358/133, 135, 136

[56] References Cited

U.S. PATENT DOCUMENTS

| | | | |
|---|---|---|---|
| 4,077,053 | 2/1978 | Ishiguro | 358/136 |
| 4,217,609 | 8/1980 | Hatori | 358/136 |
| 4,386,366 | 5/1983 | Mori | 358/135 |
| 4,468,708 | 8/1984 | Coleman | 358/310 |
| 4,546,386 | 10/1985 | Matsumoto et al. | 358/136 |
| 4,651,206 | 3/1987 | Ohki | 358/136 |

FOREIGN PATENT DOCUMENTS 56-51087 10/1982 Japan .

OTHER PUBLICATIONS

Nicol, R. C., "Interfacing intraframe D.P.C.M. with conditional replenishment coding for viewphone signals", The Radio and Electronic Engineer, vol. 48, No. 6, Jun. 1978, pp. 277-284.

Limb et al., "An Interframe Coding Technique for Broadcast Television", SMPTE Journal, vol. 89, No. 6, Jun. 1980, pp. 451-457.

Pirsch, P., "Block Coding of Color Video Signals", NTC National Telecommunications Conference Record, vol. 1, 5-7, Dec. 1977, pp. 10:5-1 to 10:5-5.

Yamamoto, H. et al., "30 Mbit/s Codes for the NTSC Color TV Signal Using An Interfield-intrafield Adaptive Prediction", IEEE Transactions on Communications, vol. Com-29, No. 12, Dec. 1981, pp. 1859-1867.

Primary Examiner—Vincent P. Canney

[57] ABSTRACT

A method for recording and/or reproducing digitally coded video signals. A frame sequence is coded in such a way that an intraframe coded picture having a fixed or variable block length is recorded at the beginning. A fixed number of interframe coded pictures follow. The block length of the interframe coded pictures can be both fixed and variable. A cutting begins with and ends before an intraframe coded picture.

10 Claims, 1 Drawing Sheet

U.S. Patent    Nov. 6, 1990    4,969,055
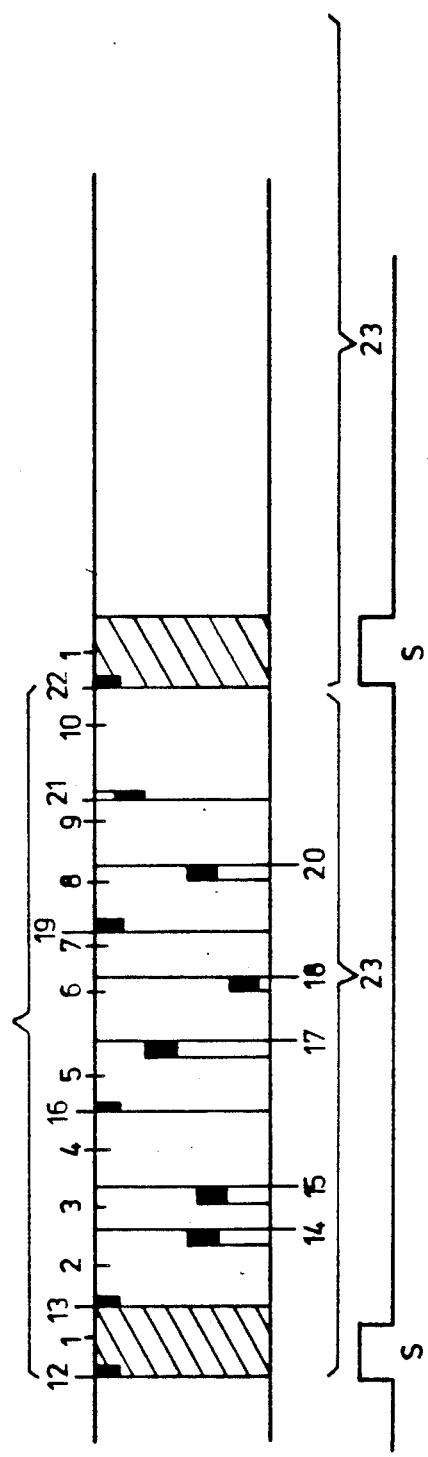

METHOD FOR RECORDING AND/OR REPRODUCING DIGITALLY CODED SIGNALS WITH INTERFRAME AND INTERFRAME CODING

This application is a continuation of application Ser. No. 06/901,535, filed as PCT EP85/00505 on Oct. 1, 1985, published as WO86/02516 on Apr. 24, 1956, now abandoned.

BACKGROUND OF THE INVENTION

The ivention relates to a method for recording and/or reproducing digitally coded signals, in particular digital video signals on any recording media, having a throughput reduced to the throughout actually required for the reproduction of a picture and achieved, among other things, by means of interframe and intraframe coding.

To record digital colour pictures containing approximately 216 Mbit/s or raw data, it is necessary to reduce the data to be recorded for a narrow-band channel as represented, for example, by a video recorder. Among others, the following methods for data reduction are known.

1. Intraframe coded pictures. Interframe coding is a known process in which pixels of successive images of the same coordinate position are compared with one another and only the deviation is coded and recorded as information content. If the comparison indicates that no deviations exist, the values are not recorded but are instead regenerated during playback by repeating the pixels of the preceding. In this case the content of a picture is reduced in such a way that the information to be transmitted is reduced by the redundant and/or irrelevant portions.

2. Interframe coded pictures. Interframe coding is a known process in which the pixels of an image, whose mutual positions respective to columns and rows are arranged, for example, in the form of the "5" on a die, are compared and are reduced in their redundant and/or irrelevant components. During this coding only the differences in consecutive frames are recorded.

The disadvantage of the intraframe coded recording lies in the fact that with a throughput required for recording of 10–15 Mbit/s the picture quality is very poor. Less than 10% of the information is recorded.

The disadvantage of the interframe coded recording lies in the fact that it is not possible to start the reproduction at any point of the recording since the information is only relative. The starting frame is missing.

SUMMARY OF THE INVENTION

The invention is based on the object of providing a recording method which combines the advantages of data reduction through intraframe and interframe coding and which at the same time allows a highspeed search run as well as an insert cutting to be carried out.

This object is achieved by determining the beginning of a frame reference by an intraframe coded picture with a fixed or variable block length, and following this with a number of interframe coded pictures.

According to the invention, a frame sequence is coded in such a way that an intraframe coded pictuure is recorded at the beginning of the frame sequence and is followed by a number of interframe coded pictures. The intraframe coded picture can have both a fixed and a variable block length. The interframe coded pictures have a variable block length. The frame sequence contains a constant or variable number of coded frames.

BRIEF DESCRIPTION OF THE DRAWING

An exemplary embodiment of the invention is explained on the basis of the drawing wherein the Figure shows the structure of a frame sequence.

DESCRIPTION OF THE PREFERRED EMBODIMENT

A frame sequence 23 consists of one intraframe coded picture 1 and a number of interframe coded pictures 2–10. Each picture 1–10 has at the beginning a frame synchronizing signal 12–21. The block length of the intraframe coded picture 1 is constant. The block length of the interframe coded pictures 2–10 is variable and depends on the information difference in the consecutive frames. The intraframe coded picture 1 is identified at the beginning of each frame sequence 23 by an intraframe identification signal S.

Through this recording method it is possible to carry out a highspeed search run in both directions. An intraframe coded picture is scanned at every n-th intraframe identification signal, whereby n is a whole number.

Furthermore, an insert cutting is possible. Every cutting begins with and ends before an intraframe coded picture.

What is claimed is:

1. A method for recording and/or reproducing digitally coded signals, particularly digital video signals on magnetic tape, having a throughput reduced to the throughput actually required for the reproduction of a picture and achieved, among other things, by means of interframe and intraframe coding, characterized in that the beginning of each frame sequence is determined by an intraframe coded picture, and that a fixed number of interframe coded pictures/follow.

2. A method according to claim 1, characterized in that the interframe coded pictures have a variable block length.

3. A method according to claim 1, characterized in that the interframe coded pictures have a fixed block length.

4. A method according to claim 1, characterized in that the beginning of a frame sequence is indicated by an intraframe identification signal.

5. A method according to claim 4, characterized in that the intraframe identification signal is recorded on its own track.

6. A method according to claim 1, characterized in that the intraframe coded picture has a constant block length.

7. A method according to claim 1, characterized in that the intraframe coded picture has a variable block length.

8. In a method of recording and/or reproducing digitally coded signals having a throughput reduced to the throughput actually required for the reproduction of picture frames in a picture frame sequence and achieved using interframe and intraframe coding, the improvement wherein the method includes the steps of determining a first frame of each picture frame sequence by an intraframe coded picture and determining succeeding frames of the picture frame sequence by following the intraframe coded picture with a fixed number of interframe coded pictures.

9. A method as in claim 8, wherein the coded signals are digital video signals, the method including the step to recording the digital video signals on magnetic tape.

10. A method as in claim 8, wherein the coded signals are digital video signals, the method including the step to reproducing the digital video signals on magnetic tape.

* * * * *

UNITED STATES PATENT AND TRADEMARK OFFICE
CERTIFICATE OF CORRECTION

PATENT NO. : 4,969,055

DATED : November 6, 1990

INVENTOR(S) : Oberjatzas et al.

It is certified that error appears in the above-identified patent and that said Letters Patent is hereby corrected as shown below:

On the title page under item [56] please insert the following:

--Attorney, Agent, or Firm-Spencer & Frank--

Signed and Sealed this

Twenty-eighth Day of July, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 4,969,055
DATED : November 6, 1990
INVENTOR(S) : Günter OBERJATZAS et al.

It is certified that error appears in the above-indentified patent and that said Letters Patent is hereby corrected as shown below:

On the cover sheet, left hand column, before the line beginning with "[21]", insert:

--[73] Assignee: Telefunken Fernseh und Rundfunk GmbH, Hanover, Federal Republic of Germany Signed and Sealed this Seventeenth Day of January, 1995

Attest:

BRUCE LEHMAN

*Attesting Officer*      *Commissioner of Patents and Trademarks*